United States Patent
Inoue et al.

[11] Patent Number: 6,052,273
[45] Date of Patent: Apr. 18, 2000

[54] SOLID ELECTROLYTE CAPACITOR

[75] Inventors: Hirohumi Inoue, Saga; Nobuhiro Honda, Ogi-gun, both of Japan

[73] Assignees: Sanyo Electric Co., Ltd., Moriguchi; Saga Sanyo Industries Co., Ltd., Saga, both of Japan

[21] Appl. No.: 09/059,575

[22] Filed: Apr. 14, 1998

[30] Foreign Application Priority Data

Apr. 15, 1997 [JP] Japan .................................... 9-097143

[51] Int. Cl.[7] .............................. H01G 9/00; H01G 9/10
[52] U.S. Cl. .......................... 361/523; 361/533; 361/536
[58] Field of Search .................... 361/523, 525, 361/528, 530, 533, 535–537, 540, 511–512, 517–519; 174/50.56, 50.5, 50.61, 50.62, 52.1–52.4

[56] References Cited

U.S. PATENT DOCUMENTS

| | | | |
|---|---|---|---|
| 2,310,932 | 2/1943 | Brennan et al. | 361/512 |
| 2,535,945 | 4/1950 | Menchik et al. | 361/535 |
| 4,580,855 | 4/1986 | Niwa . | |
| 4,942,501 | 7/1990 | MacFarlane et al. | 361/523 |
| 5,146,391 | 9/1992 | MacFarlane et al. | 361/525 |
| 5,673,168 | 9/1997 | Efford et al. | 361/518 |

FOREIGN PATENT DOCUMENTS

| | | |
|---|---|---|
| 62-51489 | 10/1987 | Japan . |
| 62-51491 | 10/1987 | Japan . |
| 62-52939 | 11/1987 | Japan . |
| 2-2277215 | 11/1990 | Japan .................................... 361/536 |
| 4-66373 | 10/1992 | Japan . |

*Primary Examiner*—Dean A. Reichard
*Assistant Examiner*—Anthony Dinkins
*Attorney, Agent, or Firm*—Armstrong, Westerman, Hattori, McLeland & Naughton

[57] ABSTRACT

A solid electrolyte capacitor has a metal case 3 housing a capacitor element 1 and closed by a hermetic seal structure. More specifically, the case 3 has an opening closed with a seal plate 4 of nickel alloy. The capacitor element 1 has a pair of lead wires 15, 15 which are joined at their outer end faces respectively to lower end faces of a pair of lead pins 2, 2 by resistance welding. The lead pins 2, 2 are inserted through holes 41, 41 in the seal plate 4, with an insulating glass seal 5 filled in a clearance in each of the holes 41, 41 around the lead pin 2. The opening-defining edge of the case 3 and the outer peripheral edge of the seal plate 4 are joined to each other by resistance welding. Consequently, the capacitor retains high reliability over a prolonged period of time.

22 Claims, 7 Drawing Sheets

SOLID ELECTROLYTE CAPACITOR

FIELD OF THE INVENTION

The present invention relates to solid electrolyte capacitors, and more particularly to hermetic seal structures for use in solid electrolyte capacitors comprising a capacitor element impregnated with a solid electrolyte, and a case having the capacitor element housed therein and hermetically sealed off.

BACKGROUND OF THE INVENTION

JP-B No. 51489/1987, JP-B No. 51491/1987, JP-B No. 66373/1992, U.S. Pat. No. 4,580,855, etc. disclose solid electrolyte capacitors which comprise a capacitor element including a metal member and impregnated with a TCNQ complex salt as an electrolyte, the metal member acting as a valve and being formed with a chemical conversion coating. "TCNQ" stands for 7,7,8,8-tetracyanoquinodimethane.

FIG. 13 shows one type of solid electrolyte capacitor which is already known and has a bottomed tubular aluminum case 9 housing a capacitor element 1, filled with an epoxy resin 91 and having its opening sealed off.

As shown in FIG. 14, the capacitor element 1 comprises an anode foil 11 which is an etched aluminum foil formed with a chemical conversion coating, and a cathode foil 12 opposed to and superposed on the anode foil 11 with a separator 13 interposed therebetween. The capacitor element is prepared by winding up the assembly of the foils and separator into a roll, and impregnating the roll with a solid electrolyte such as a TCNQ complex salt.

A pair of lead terminals 14, 14 are joined to the anode foil 11 and the cathode foil 12 and have lead wires 15, 15 extending therefrom.

The solid electrolyte capacitor described is fabricated by filling a suitable amount of powder of TCNQ salt into a case 9 first, heating the case at 250 to 350° C. to melt the salt into a liquid, immersing the roll into the molten salt to impregnate the roll with the salt, thereafter rapidly cooling the roll as placed in the case to solidify the salt and finally filling an epoxy resin 91 into the case 9.

Further attention has been directed to solid electrolyte capacitors which are compact, have a great capacity and are small in equivalent series resistance (hereinafter referred to as "ESR") and in which an electrically conductive polymer, such as polypyrrole, polythiophene, polyfuran or polyaniline, is used as a cathode material.

Like the structure shown in FIG. 14, the solid electrolyte capacitor of this type is prepared by winding an assembly of anode foil 11 formed with a chemical conversion coating, cathode foil 12 and interposed separator 13 into a roll, forming an electrically conductive polymer layer in the roll to obtain a capacitor element 1, housing the capacitor element 1 in a case .9 and filling an epoxy resin 91 into an opening portion of the case for sealing as seen in FIG. 13.

The prior-art solid electrolyte capacitors described have the problem of impaired reliability involving variations in capacitance and increases in ESR due to the degradation of the sealing epoxy resin or the penetration of moisture through the portion of contact between the sealing epoxy resin and the case or through the portion of contact between the sealing epoxy resin and the lead wire.

The solid electrolyte capacitor wherein the conductive polymer is used as a cathode material has another problem. Before the epoxy resin poured in for sealing cures, a component of the resin penetrates into the capacitor element to lower the electric conductivity of the polymer to result in increased ESR, or the thermal stresses involved in the pouring and curing of the epoxy resin cause damage to the chemical conversion coating on the anode foil of the capacitor element to increase the leakage current (hereinafter referred to as "LC").

SUMMARY OF THE INVENTION

Accordingly, the present invention overcomes the foregoing problems of the seal structures of the conventional solid electrolyte capacitors.

The present invention provides a solid electrolyte capacitor comprising a tubular metal case having an opening at one end and closed at the other end, and a capacitor element housed in the case. The capacitor element comprises an anode foil, a cathode foil and a separator interposed therebetween which are wound up into a roll, and is prepared by impregnating the roll with a solid electrolyte or by forming an electrically conductive polymer layer in the roll. The anode foil and the cathode foil have a pair of lead wires extending therefrom respectively. The case is closed with a hermetic seal structure.

With the solid electrolyte capacitor of the invention, the hermetic seal structure which is excellent in weather resistance and airtightness, is used for closing the case, consequently obviating the likelihood of moisture penetrating into the case and permitting the capacitor to exhibit its initial performance over a prolonged period of time.

Stated specifically, the hermetic seal structure comprises:
a metal seal plate 4 formed with a pair of through holes 41, 41 and installed to close the opening of the case 3, the seal plate 4 having an outer peripheral edge portion 42 joined to an opening-defining edge portion 31 of the case 3;
a pair of lead pins 2, 2 inserted through the respective holes 41, 41 of the seal plate 4 without contacting inner peripheries of the seal plate defining the respective holes; and
insulating seals 5, 5 filled in respective clearances in the holes 41, 41 of the seal plate 4 around the lead pins 2, 2;
the lead wires 15, 15 having respective outer ends thereof joined within the case 3 to respective base ends of the lead pins 2, 2.

In assembling the solid electrolyte capacitor having the hermetic seal structure described, lead pins 2, 2 are first inserted through holes 41, 41 of a seal plate 4, and an insulating seal material, e.g., a molten glass, is filled into clearances in the holes 41, 41 around the lead pins 2, 2 to form seals 5, whereby the clearances are closed with high airtightness, and the lead pins 2, 2 can be insulated from the seal plate 4. Next, the lower ends of the lead pins 2, 2 are joined to the respective upper ends of a pair lead wires 15, 15 extending from a capacitor element 1, for example, by resistance welding. The capacitor element 1 is thereafter placed into a case 3, the seal plate 4 is placed over the opening of the case 3, and the outer peripheral edge portion 42 of the seal plate 4 is joined to the edge portion 31 of the case 3 defining its opening, for example, by resistance welding, whereby the case 3 is sealed off with high airtightness.

In the case where the seal plate 4 is made of a ferromagnetic metal in the construction described above, the seal plate 4 acts as a coil to produce an influence of reactance by the coil component, whereas this drawback is avoidable by forming the seal plate 4 from a nonmagnetic metal.

According to another embodiment, the hermetic seal structure comprises:

a metal seal plate 45 installed to close the opening of the case 33 and having an outer peripheral edge portion 46 joined to an opening-defining edge portion 35 of the case 33;

a pair of lead pins 2, 2 inserted through respective through holes 34, 34 formed in the closed end of the case 33 without contacting inner peripheries of the case closed end defining the respective holes; and insulating seals 5, 5 filled in respective clearances in the holes 34, 34 of the case 33 around the lead pins 2, 2;

the lead wires 15, 15 having respective outer ends thereof joined within the case 33 to respective base ends of the lead pins 2, 2.

In assembling the solid electrolyte capacitor having the hermetic seal structure described, lead pins 2, 2 are first inserted through holes 34, 34 in a case 33, and an insulating seal material, e.g., a molten glass, is filled into clearances in the holes 34, 34 around the lead pins 2, 2 to form seals 5, whereby the clearances are closed with high airtightness, and the lead pins 2, 2 can be insulated from the case 33. Next, the lower ends of the lead pins 2, 2 are joined to the respective upper ends of a pair lead wires 15, 15 extending from a capacitor element 1, for example, by resistance welding. The capacitor element 1 is thereafter placed into the case 33, the opening of the case 33 is covered with a seal plate 45, and the outer peripheral edge portion 46 of the seal plate 45 is joined to the edge portion 35 of the case 33 defining its opening, for example, by resistance welding, whereby the case 33 is sealed off with high airtightness.

With the structure described above, the joint between the seal plate 45 and the case 33 is positioned at the opening end of the case 33, whereas the insulating seals 5 are filled in the closed end of the case 33. Consequently, the heat produced for joining the seal plate 45 to the case 33 exerts little or no influence on the insulating seals 5 and the vicinity thereof. This obviates the likelihood that the sealing properties of the seals 5 will be impaired by the influence of the heat.

According to another embodiment, the hermetic seal structure comprises:

a metal seal plate 4 formed with a pair of through holes 43, 43 and installed to close the opening of the case 3, the seal plate 4 having an outer peripheral edge portion 42 joined to an opening-defining edge portion 31 of the case 3;

a pair of metal pipe pieces 6, 6 each having a center bore 61 and inserted through the respective holes 43, 43 of the seal plate 4 without contacting inner peripheries of the seal plate defining the respective holes, the lead wires 15, 15 extending through the respective center bores 61, 61 without contacting bore- defining inner peripheries of the pipe pieces 6, 6;

insulating seals 51, 51 filled in respective clearances in the holes 43, 43 of the seal plate 4 around the pipe pieces 6, 6; and a brazing material 53 filled in respective clearances in the pipe pieces 6, 6 around the lead wires 15, 15.

In assembling the solid electrolyte capacitor having the hermetic seal structure described, metal pipe pieces 6, 6 are first inserted through holes 43, 43 of a seal plate 4, and an insulating seal material, e.g., a molten glass, is filled into clearances in the holes 43, 43 around the pipe pieces 6, 6 to form seals 51, whereby the clearances are closed with high airtightness, and the pipe pieces 6, 6 can be insulated from the seal plate 4. Next, a pair lead wires 15, 15 extending from a capacitor element 1 are inserted through the respective center bores 61, 61 of the pipe pieces 6, 6, the capacitor element 1 is placed into a case 3, the seal plate 4 is then placed over the opening of the case 3, and the outer peripheral edge portion 42 of the seal plate 4 is joined to the edge portion 31 of the case 3 defining its opening, for example, by resistance welding. Finally a brazing material 53, e.g., molten solder, is filled into clearances in the center bores 61, 61 of the pipe pieces 6, 6 around the lead wires 15, 15, whereby the clearances are closed with high airtightness.

Consequently, the case 3 is sealed off with high airtightness.

According to another embodiment, the hermetic seal structure comprises:

a metal seal plate 45 installed to close the opening of the case 33 and having an outer peripheral edge portion 46 joined to an opening-defining edge portion 35 of the case 33;

a pair of metal pipe pieces 6, 6 each having a center bore 61 and inserted through respective through holes 36, 36 formed in the closed end of the case 33 without contacting inner peripheries of the case closed end defining the respective holes, the lead wires 15, 15 extending through the respective center bores 61, 61 without contacting bore-defining inner peripheries of the pipe pieces 6, 6;

insulating seals 51, 51 filled in respective clearances in the holes 36, 36 of the case 33 around the pipe pieces 6, 6; and a brazing material 53 filled in respective clearances in the pipe pieces 6, 6 around the lead wires 15, 15.

In assembling the solid electrolyte capacitor having the hermetic seal structure described, metal pipe pieces 6, 6 are first inserted through holes 36, 36 in a case 33, and an insulating seal material, e.g., a molten glass, is filled into clearances in the holes 36, 36 around the pipe pieces 6, 6 to form seals 51, whereby the clearances are closed with high airtightness, and the pipe pieces 6, 6 can be insulated from the case 33. Next, a pair lead wires 15, 15 extending from a capacitor element 1 are inserted through the respective center bores 61, 61 of the pipe pieces 6, 6, the capacitor element 1 is placed into the case 33, the opening of the case 33 is covered with a seal plate 45, and the outer peripheral edge portion 46 of the seal plate 45 is joined to the edge portion 35 of the case 33 defining its opening, for example, by resistance welding. Finally a brazing material 53, e.g., molten solder, is filled into clearances in the center bores 61, 61 of the pipe pieces 6, 6 around the lead wires 15, 15, whereby the clearances are closed with high airtightness.

Consequently, the case 33 is sealed off with high airtightness.

With the structure described above, the joint between the seal plate 45 and the case 33 is positioned at the opening end of the case 33, whereas the insulating seals 51 are filled in the closed end of the case 33. Consequently, the heat produced for joining the seal plate 45 to the case 33 exerts little or no influence on the insulating seals 51 and the vicinity thereof. This obviates the likelihood that the sealing properties of the seals 51 will be impaired by the influence of the heat.

In the case where the pipe piece 6 is made of a ferromagnetic metal in the construction described above, the pipe piece 6 acts as a coil to produce an influence of reactance by the coil component, whereas this drawback is avoidable by forming the pipe piece from a nonmagnetic metal.

In another solid electrolyte capacitor embodying the invention, a rubber seal member 7 is hermetically fitted in the opening of the case 30, the lead wires 15, 15 extending through the seal member 7 hermetically, the case 30 having an inert gas atmosphere or a vacuum enclosed therein.

With the capacitor of the invention described above, the rubber seal member 7 is used as a seal structure for closing the case, and the case has an inert gas atmosphere or a vacuum enclosed therein. This renders the interior of the case free of the influence of moisture, permitting the capacitor to exhibit the initial performance for a prolonged period of time.

The solid electrolyte capacitor with the structure described above has a constricted opening portion 32 having the seal member 7 fitted therein for compressing the seal member over the entire circumference thereof to seal off the opening hermetically.

The constricted portion causes the rubber seal member 7 to exhibit improved sealing properties.

The hermetic seal structure used in the solid electrolyte capacitors of the present invention obviates the likelihood of moisture affecting the capacitor element, assuring the capacitor of high reliability over a prolonged period of time.

DETAILED DESCRIPTION OF EMBODIMENTS

Embodiments of the invention will be described below in detail with reference to the drawings.

First Embodiment

Figure 14:
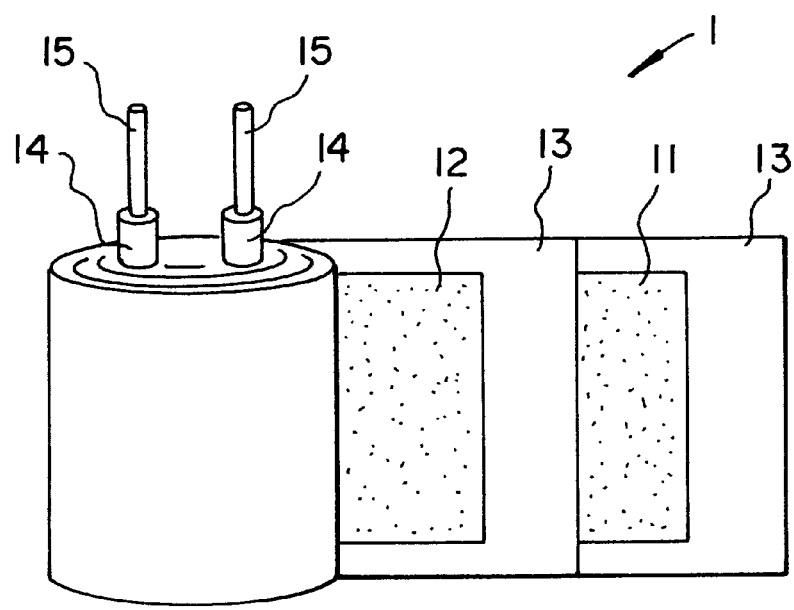
FIG. 14 is a perspective view showing. the construction of a capacitor element.

The solid electrolyte capacitor according to this embodiment comprises a capacitor element 1 which is prepared, as shown in FIG. 14, by superposing a cathode foil 12 on an anode foil 11 formed with a chemical conversion coating, with a separator 13 interposed between the foils, winding the resulting assembly into a roll, and impregnating the roll with a solid electrolyte comprising a TCNQ complex salt such as N-n-butyl isoquinolinium TCNQ2.

Figure 1:
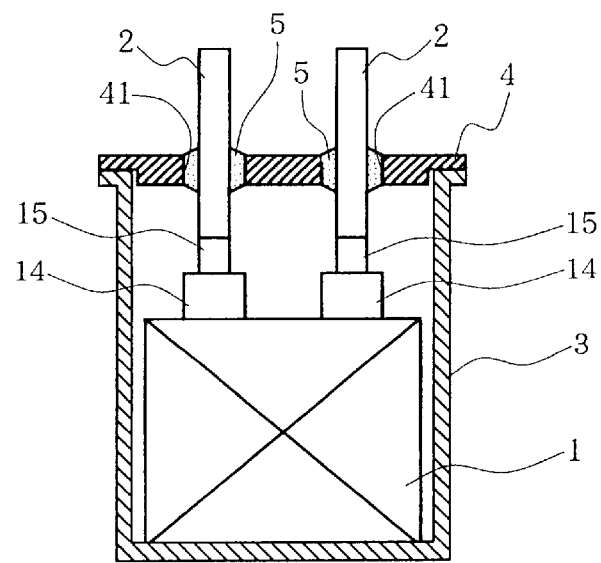
FIG. 1 is a sectional view of a solid electrolyte capacitor as a first embodiment of the invention.
Figure 2:
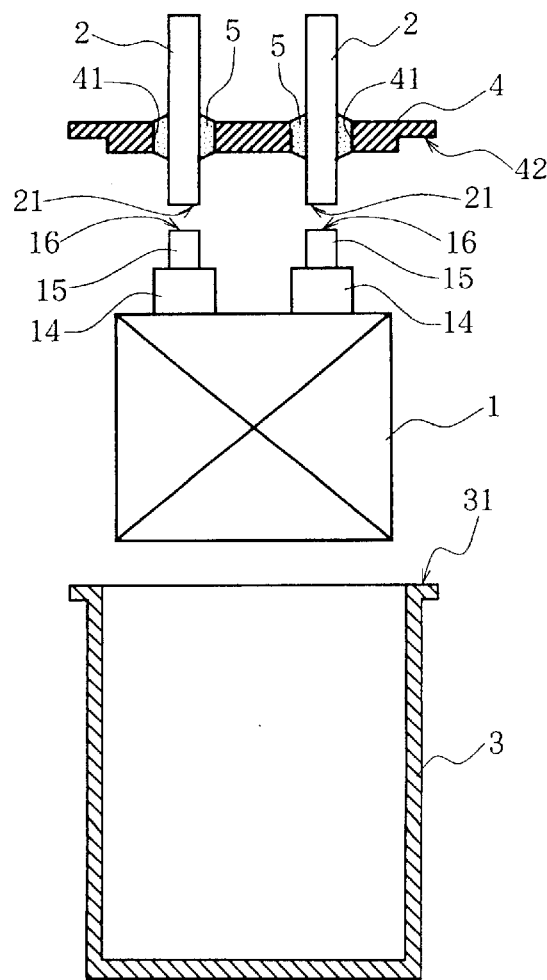
FIG. 2 is a sectional view showing a process for assembling the capacitor.

The capacitor element 1 is housed in a hollow cylindrical steel case 3 having a bottom and plated with nickel as seen in FIGS. 1 and 2. The case 3 is closed with a first hermetic seal structure embodying the invention.

Stated more specifically, the case 3 has an opening, which is closed with a disklike seal plate 4 made of nickel alloy and having a pair of through holes 41, 41. On the other hand, a pair of lead wires 15, 15 extending from the capacitor element 1 have respective outer end faces 16, 16, which are joined to the respective lower end faces 21, 21 of a pair of lead pins 2, 2 by resistance welding. The lead pins 2, 2 are inserted through the holes 41, 41 of the seal plate 4 without contacting the inner peripheries of the plate 4 defining the holes. An insulating seal 5 of glass is filled in a clearance in each of the holes 41, 41 of the seal plate 4 around the lead pin 2 to effect electrical insulation and to seal off the clearance. The opening-defining edge portion 31 of the case 3 is joined to the outer peripheral edge portion 42 of the seal plate 4 by resistance welding.

The capacitor element 1 is prepared by filling a suitable amount of powder of a TCNQ complex salt into an aluminum container (not shown) first, heating the powder at 250 to 350° C. to melt the salt to a liquid, immersing the above-mentioned roll into the molten salt, and thereafter cooling the roll as withdrawn from the container to solidify the TCNQ salt impregnating the roll.

In assembling the solid electrolyte capacitor of the present embodiment, lead pins 2, 2 are inserted through holes 41, 41 of a seal plate 4, and a molten glass having a low melting point, such as PbO-B2O3 or ZnO-B2O3 glass, is poured into clearances in the holes 41, 41 around the lead pins 2, 2 to form insulating seals 5, 5 as shown in FIG. 2.

Subsequently, the lead wires 15, 15 of the capacitor element 1 are cut to a short length, and the lower end faces 21, 21 of the lead pins 2, 2 are welded to the respective outer cut end faces 16, 16 by resistance welding.

The capacitor element 1 having the seal plate 4 connected thereto is then placed into a case 3, and the outer peripheral edge portion 42 of the seal plate 4 is joined to the opening-defining edge portion 31 of the case 3 by resistance welding.

A joining method such as laser welding or solder brazing may be resorted to instead of resistance welding.

Second Embodiment

Figure 3:
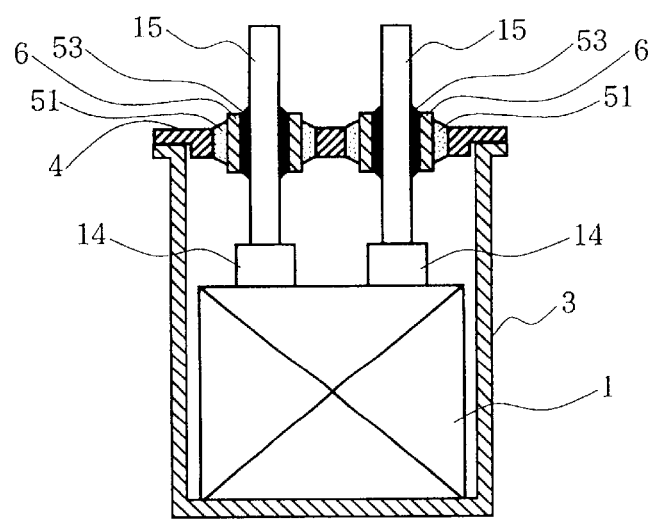
FIG. 3 is a sectional view of another solid electrolyte capacitor as a second embodiment.
Figure 4:
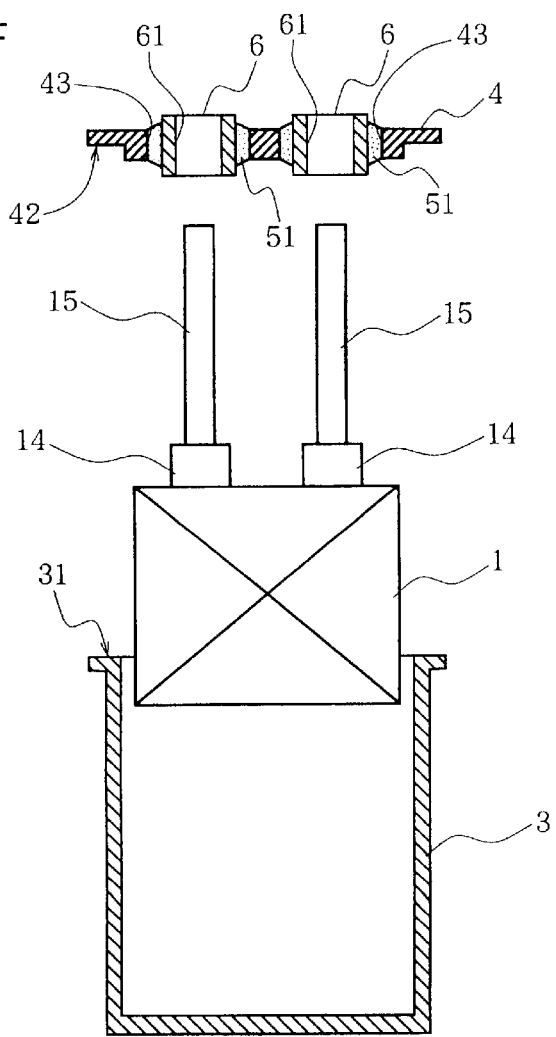
FIG. 4 is a sectional view of a process for assembling the capacitor.

As shown in FIGS. 3 and 4, the solid electrolyte capacitor of this embodiment comprises a capacitor element 1 having the same construction as in the first embodiment and housed in a hollow cylindrical steel case 3, which has a bottom and is plated with nickel and closed with a second hermetic seal structure embodying the invention.

Stated more specifically, the case 3 has an opening, which is closed with a disklike seal plate 4 made of nickel alloy and having a pair of through holes 43, 43. A pair of nickel-iron pipe pieces 6, 6 each having a center bore 61 are inserted through the respective holes 43, 43 of the seal plate 4 without contacting the inner peripheries of the plate 4 defining the bores. Insulating glass seals 51, 51 are filled in clearances in the holes 43, 43 of the seal plate 4 around the pipe pieces 6, 6 to effect electrical insulation and to seal off the clearances.

A pair of lead wires 15, 15 extending from the capacitor element 1 extend through the respective center bores 61, 61 of the pipe pieces 6, 6 without contacting the inner peripheries of the pipe pieces defining the bores. Solder or like brazing material 53 is filled into clearances in the pipe pieces 6, 6 around the lead wires 15, 15 to seal off the clearances. The edge portion 31 of the case 3 defining its opening is joined to the outer peripheral edge portion of the seal plate 4 by resistance welding.

The capacitor element 1 is produced by the same process as in the first embodiment. In assembling the solid electrolyte capacitor of the present embodiment, pipe pieces 6, 6 are inserted through bores 43, 43 of a seal plate 4, and a molten glass is poured into clearances in the holes 43, 43 around the pipe pieces 6, 6 to form insulating seals 51, 51 and seal off the clearances.

Next, a pair of lead wires 15, 15 extending from the capacitor element 1 are inserted through respective center bores 61, 61 of the pipe pieces 6, 6, the capacitor element 1 is placed into a case 3, the seal plate 4 is thereafter placed over an opening of a case 3, and the outer peripheral edge portion 42 of the seal plate 4 is joined to the opening-defining edge portion 31 of the case 3 by resistance welding, whereby the case 3 is sealed off with high airtightness.

Finally, molten solder serving as brazing material 53 is poured into clearances in the center bores 61, 61 of the pipe pieces 6, 6 around the lead wires 15, 15. The brazing material 53 gives the required sealing effect even if filling only the inlet portion of each clearance.

The solid electrolyte capacitors of the first an second embodiments wherein the epoxy resin is not used for the seal members unlike the prior art are free of the conventional problem such as the penetration of moisture due to the degradation of the epoxy resin or the penetration of moisture through the portion of contact between the epoxy resin and the case or through the portion of contact between the epoxy resin and the lead wire. The solid electrolyte impregnating the capacitor element within the case is not in contact with any epoxy resin and therefore remains undegraded even if the capacitor is used in an aggravating environment, whereby the capacitor is assured of reliability.

Figure 13:
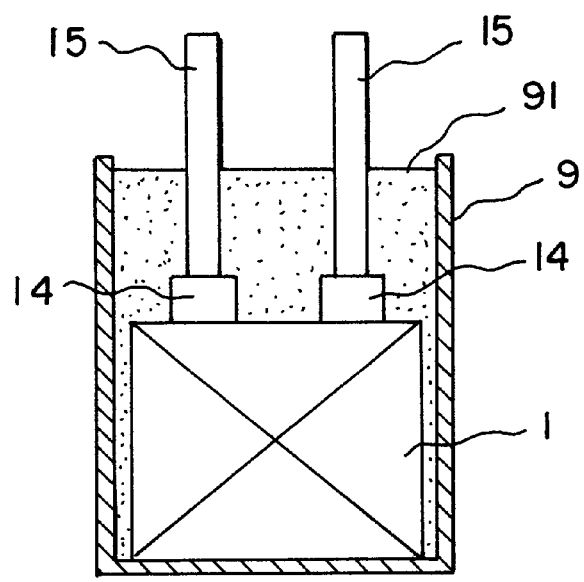
FIG. 13 is a sectional view of a conventional solid electrolyte capacitor.

The conventional solid electrolyte capacitor shown in FIG. 13 (Conventional Example), the solid electrolyte capacitor according to the first embodiment of FIG. 1 and having usual air enclosed in the case(Invention Example 1A), the solid electrolyte capacitor according to the second embodiment of FIG. 3 and having usual air enclosed in the case (Invention Example 2A), the solid electrolyte capacitor according to the first embodiment and having nitrogen gas enclosed in the case(Invention Example 1B) and the solid electrolyte capacitor according to the second embodiment and having nitrogen gas enclosed in the case (Invention Example 2B) were subjected to two kinds of reliability tests, i.e., to a high-temperature load test by applying the rated voltage to the capacitor continuously for 1000 hours in an environment of 125° C. and ordinary humidity, and to a high-temperature high-humidity test by allowing the capacitor to stand in an environment of 85° C. and RH 85% for 1000 hours without application of voltage. The capacitors were checked for electric characteristics before and after testing. Tables 1 and 2 show the results.

TABLE 1

High-Temperature Load Test

|  | BEFORE TEST | | | AFTER TEST | |
| --- | --- | --- | --- | --- | --- |
|  | C ($\mu$F) | tan δ (%) | ESR (m Ω) | Δ C/C (%) | ESR (m Ω) |
| CONVENTIONAL EX. | 32.8 | 2.3 | 30 | −17.5 | 46 |
| INVENTION EX. 1A | 33.1 | 2.4 | 34 | −7.9 | 36 |
| INVENTION EX. 2A | 33.0 | 2.6 | 35 | −6.8 | 38 |

TABLE 1-continued

High-Temperature Load Test

|  | BEFORE TEST | | | AFTER TEST | |
| --- | --- | --- | --- | --- | --- |
|  | C ($\mu$F) | tan δ (%) | ESR (m Ω) | Δ C/C (%) | ESR (m Ω) |
| INVENTION EX. 1B | 33.6 | 2.5 | 33 | −2.4 | 35 |
| INVENTION EX. 2B | 33.3 | 2.5 | 32 | −1.9 | 34 |

TABLE 2

High-Temperature High-Humidity Test

|  | BEFORE TEST | | | AFTER TEST | |
| --- | --- | --- | --- | --- | --- |
|  | C ($\mu$F) | tan δ (%) | ESR (m Ω) | Δ C/C (%) | ESR (m Ω) |
| CONVENTIONAL EX. | 32.7 | 2.2 | 31 | −9.2 | 46 |
| INVENTION EX. 1A | 33.4 | 2.6 | 34 | −1.5 | 34 |
| INVENTION EX. 2A | 32.9 | 2.5 | 35 | −1.1 | 35 |
| INVENTION EX. 1B | 33.2 | 2.5 | 34 | −0.6 | 34 |
| INVENTION EX. 2B | 33.1 | 2.4 | 33 | −0.6 | 33 |

The capacitor element used in any of Invention Examples and Conventional Example listed in Tables 1 and 2 had ratings of 16 V and 33 $\mu$F. The capacitors as completed externally measured 6.3 mm in outside diameter and 8 mm in length L in the case of Invention Examples, and 6.3 mm in outside diameter and 7 mm in length L in the case of Conventional Example. In Tables 1 and 2, represented by C is the capacitance at 120 Hz, by tan δ the tangent of loss angle at 120 Hz, by ESR the equivalent series resistance at 100 kHz, and by Δ C/C the ratio of the variation of capacitance resulting from the test to the capacitance before the test. Each of the characteristics values is the average for ten specimens.

Tables 1 and 2 reveal that Invention Examples 1A, 2A, 1B and 2B are all smaller than Conventional Example in the variation of capacitance and the increase in ESR resulting from the reliability tests, also indicating that Examples 1B and 2B wherein nitrogen gas was enclosed in the case are especially much smaller in the variation of capacitance.

The effect of the nitrogen gas enclosed in the case appears attributable to the suppressed degradation of the solid electrolyte due to the removal of oxygen contained in air. A comparable effect is obtained when other inert gas such as argon gas or a vacuum is enclosed in the case in place of nitrogen gas.

Third Embodiment

Figure 5:
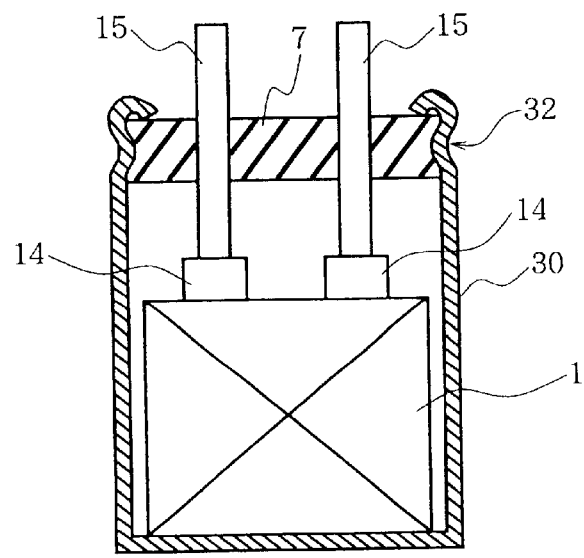
FIG. 5 is a sectional view of another solid electrolyte capacitor as a third embodiment.
Figure 6:
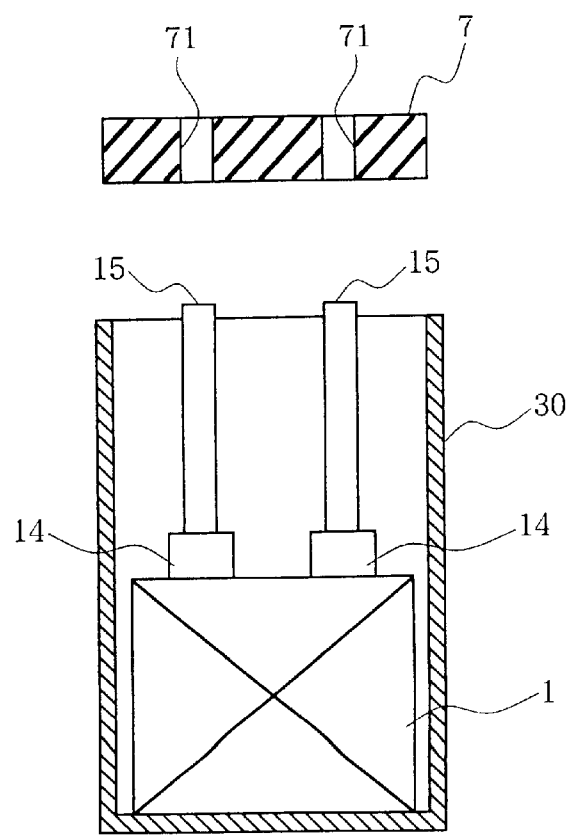
FIG. 6 is a sectional view of a process for assembling the capacitor.

As shown in FIGS. 5 and 6, the solid electrolyte capacitor of this embodiment comprises a capacitor element 1 having the same construction as in the first embodiment and housed in a hollow cylindrical aluminum case 30 having a bottom. The case 30 has an opening, in which a butyl rubber seal member 7 formed with a pair of through holes 71, 71 is hermetically fitted. Nitrogen gas is enclosed in the case 30. A pair of lead wires 15, 15 extending from the capacitor element 1 hermetically extend through the respective holes 71, 71 of the seal member 7. The case 30 has a constricted opening portion 32 having the seal member 7 fitted therein for compressing the seal member 7 over the entire circumference thereof to seal off the opening hermetically.

In fabricating the solid electrolyte capacitor of the present embodiment, a suitable amount of powder of a TCNQ complex salt is first placed into a bottomed cylindrical aluminum case 30 shown in FIG. 6 and then heated at 250 to 350° C. to melt the salt to a liquid. The above-mentioned roll is immersed in the molten salt and thereafter cooled as contained in the case to solidify the TCNQ salt. In a nitrogen gas atmosphere, a pair of lead wires 15, 15 extending from a capacitor element 1 are subsequently inserted through holes 71, 71 of a seal member 7, and the seal member 7 is pushed into the opening of the case 30. The case 30 is then constricted at the portion thereof close to the opening-defining edge thereof to hold the inner periphery of the case 30 in intimate contact with the outer periphery of the seal member 7 by the compression of the constricted portion 32. The opening-defining edge portion of the case 30 is further curled.

The hermetic seal structure of the solid electrolyte capacitor of the present embodiment is inferior to those of the first and second embodiments in suppressing the penetration of atmospheric moisture due to the degradation of the conventional seal member or the ingress of moisture through the portion of contact between the seal member and the case, whereas the solid electrolyte impregnating the capacitor element within the case remains free of degradation unless the capacitor is used in an environment of extremely high humidity because the solid electrolyte is out of contact with any epoxy resin unlike the conventional structure and further because an inert gas is enclosed in the case.

Although JP-A No. 148385/1996 discloses a solid electrolyte capacitor wherein a hermetic seal structure comprising a rubber seal member is used, nothing has been disclosed about a case having an inert gas atmosphere or a vacuum enclosed therein.

Fourth Embodiment

The capacitor element for use in the solid electrolyte capacitor of this embodiment corresponds to the same capacitor element 1 as used in the first embodiment wherein the solid electrolyte is replaced by an electrically conductive polymer layer prepared, for example, by the oxidative polymerization of 3,4-ethylenedioxythiophene and formed in the roll.

As in the first embodiment, the capacitor element is housed in a bottomed cylindrical steel case plated with nickel and sealed off with the first hermetic seal structure previously described (see FIGS. 1 and 2).

Prepared as an anode foil in fabricating the capacitor element is an aluminum foil rough-surfaced by etching and subjected to a chemical conversion treatment for forming a dielectric coating. The anode foil, a cathode foil opposed thereto and separator paper interposed therebetween are would up into a roll. On the other hand, suitable amounts of 3,4-ethylenedioxythiophene monomer and iron(III) p-toluenesulfonate serving as an oxidizer are mixed together to prepare a liquid for polymerization. The roll is immersed in the liquid and then heated at a temperature slightly higher than 100° C., whereby a layer of 3,4-ethylenedioxythiophene polymer is formed between the two electrodes of the roll to obtain a capacitor element.

The solid electrolyte capacitor comprising this capacitor element is exactly the same as the first embodiment in hermetic seal structure and assembling process, and therefore will not be described further.

Fifth Embodiment

The solid electrolyte capacitor of this embodiment comprises the same capacitor element as used in the fourth embodiment, i.e., a capacitor element wherein the solid electrolyte is an electrically conductive polymer layer, and a bottomed cylindrical steel case plated with nickel, housing the capacitor element and closed with the second hermetic seal structure (see FIGS. 3 and 4) described previously.

The solid electrolyte capacitor is exactly the same as the second embodiment in hermetic seal structure and assembling process, and therefore will not be described further.

Sixth Embodiment

The solid electrolyte capacitor of this embodiment comprises the same capacitor element as used in the fourth embodiment, and a bottomed cylindrical aluminum case housing the capacitor element and having a butyl rubber seal member fitting in the opening of the case as in the third embodiment (see FIGS. 5 and 6).

The solid electrolyte capacitor is exactly the same as the third embodiment in hermetic seal structure and assembling process, and therefore will not be described further.

The epoxy resin, if used for sealing as in the prior ar, will come into contact with the conductive polymer to impair the electric conductivity of the polymer, or is likely to cause damage to the chemical conversion coating owing to thermal stresses set up when the resin is poured in and cures, whereas the hermetic seal structures used in the solid electrolyte capacitors of the fourth to sixth embodiments are free from this problem.

Table 3 shows the electric characteristics of the conventional solid electrolyte capacitor (Conventional Example) sealed with the epoxy resin and shown in FIG. 13 and the solid electrolyte capacitors of the fourth to sixth embodiments (Invention Examples 1C to 3C).

TABLE 3

|  | C ($\mu$F) | tan δ (%) | ESR (m Ω) | LC ($\mu$A) |
|---|---|---|---|---|
| CONVENTIONAL EX. | 48.6 | 3.9 | 45 | 290 |
| INVENTION EX. 1C | 48.5 | 4.9 | 37 | 1.8 |
| INVENTION EX. 2C | 49.6 | 4.9 | 38 | 5.3 |
| INVENTION EX. 3C | 49.3 | 4.9 | 38 | 1.0 |

In any of Invention Examples and Conventional Example listed in Table 3, the capacitor element used had ratings of 4 V and 47 $\mu$F, and the conductive polymer used was the oxidation polymer of 3,4-ethylenedioxythiophene. The capacitors as completed externally measured 6.3 mm in outside diameter and 8 mm in length L in the case of Invention Examples 1C and 2C, 6.3 mm in outside diameter and 6.5 mm in length L in the case of Invention Example 3C, and 6.3 mm in outside diameter and 7 mm in length L in the case of Conventional Example.

In Table 3, represented by C is the capacitance at 120 Hz, by tan δ the tangent of loss angle at 120 Hz, by ESR the equivalent series resistance at 100 kHz, and by LC the leakage current as measured 30 seconds after the application of the rated voltage. Each of the characteristics values is the average for ten specimens.

Table 3 reveals that Invention Examples 1C to 3C are all slightly smaller than Conventional Example in ESR and are much smaller in LC.

Although not apparent from Table 3, the hermetic seal structures of the fourth and fifth embodiments are expected to be superior to the rubber seal structure of the sixth embodiment from the viewpoint of reliability problems of capacitors involving the penetration of atmospheric moisture due to the degradation of the seal member used in an aggravating environment of high temperature and high humidity, the ingress of moisture through the joint between different materials used for the seal member, and the ingress of moisture through the joint between the seal member and the case.

The epoxy resin used in the prior art for sealing will come into contact with the conductive polymer to impair the electric conductivity of the polymer, or set up thermal stresses when poured in and curing, causing damage to the chemical conversion coating, whereas the hermetic seal structures of the solid electrolyte capacitors according to the fourth to sixth embodiments described are free of this drawback and less susceptible to increases in ESR or LC than the conventional epoxy resin seal structure.

Seventh and Eighth Embodiments

Figure 7:
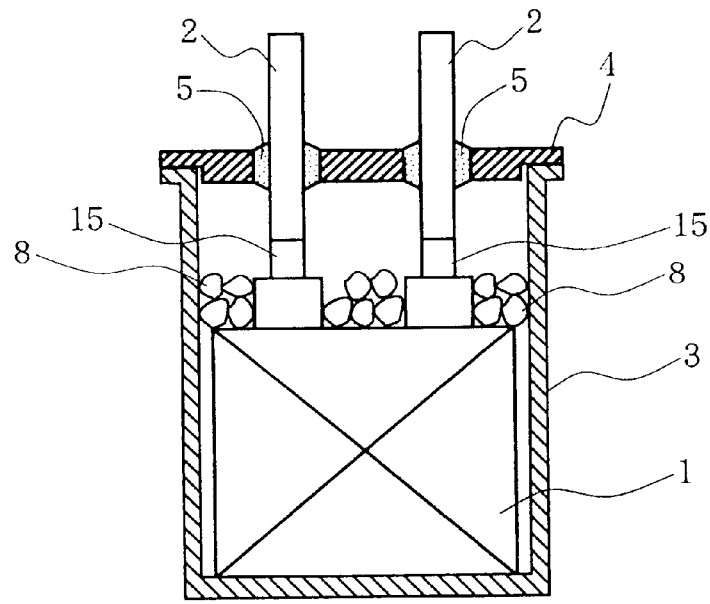
FIG. 7 is a sectional view of another solid electrolyte capacitor as a seventh embodiment.

According to the seventh embodiment, the solid electrolyte capacitor having the hermetic seal structure of the first embodiment (see FIGS. 1 and 2) has an adsorber 8, such as a molecular sieve or silica gel, placed in its case 3 as seen in FIG. 7.

Figure 8:
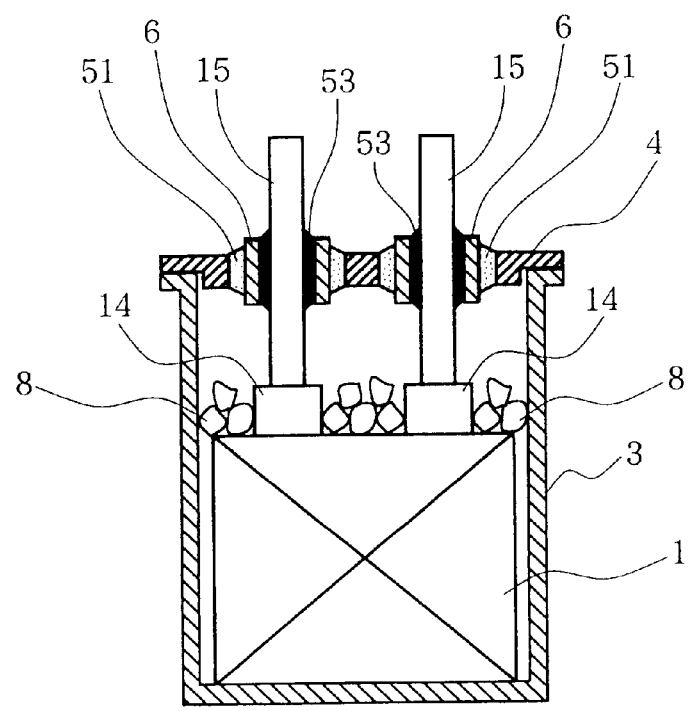
FIG. 8 is a sectional view of another solid electrolyte capacitor as an eighth embodiment.

Further according to the eighth embodiment, the solid electrolyte capacitor having the hermetic seal structure of the second embodiment (see FIGS. 3 and 4) has an adsorber 8, such as a molecular sieve or silica gel, placed in its case 3 as seen in FIG. 8.

A TCNQ complex salt or conductive polymer is usable as the solid electrolyte of the capacitor element 1.

The moisture contained in a very small amount in the capacitor element 1 before sealing is removable by the adsorber 8 placed into the case 3, whereby the thermal deterioration of the solid electrolyte, i.e., TCNQ salt or conductive polymer, namely, the impairment of the electric conductivity thereof due to heat and moisture, can be suppressed to entail improved reliability at high temperatures (of at least 125° C.).

Table 4 shows the initial electric characteristics and electric characteristics, after a reliability test, of the solid electrolyte capacitor sealed off with the epoxy resin (Conventional Example), the solid electrolyte capacitor of the first embodiment (Comparative Example A) and the seventh embodiment shown in FIG. 7 and having the molecular sieve placed therein (Invention Example D).

TABLE 4

|  | INITIAL VALUE | | | AFTER TEST | |
| --- | --- | --- | --- | --- | --- |
|  | C (μF) | tan δ (%) | ESR (m Ω) | Δ C/C (%) | ESR (m Ω) |
| CONVENTIONAL EX. | 32.8 | 2.3 | 30 | −19.5 | 49 |
| COMP. EX. A | 33.1 | 2.4 | 34 | −9.4 | 38 |
| INVENTION EX. D | 33.0 | 2.6 | 35 | −3.8 | 37 |

In any of Conventional Example, Comparative Example A and Invention Example D, the capacitor element used had ratings of 16 V and 33 μF, and the solid electrolyte used was a TCNQ complex salt. The capacitors as completed externally measured 6.3 mm in outside diameter and 10 mm in length L in the case of Comparative Example A and Invention Example D, and 6.3 mm in outside diameter and 7 mm in length L in the case of Conventional Example.

For the reliability test, the rated voltage was applied in an environment of 125° C. and ordinary humidity continuously for 1000 hours. In Table 4, represented by C is the capacitance at 120 Hz, by tan δ the tangent of loss angle at 120 Hz, by ESR the equivalent series resistance at 100 kHz, and by Δ C/C the ratio of the variation of capacitance resulting from the test to the initial capacitance value. Each of the characteristics values is the average for ten specimens.

Table 4 reveals that Invention Example D is smaller than Conventional Example and Comparative Example A in the variation of capacitance and the increase in ESR resulting from the reliability test.

A comparable result is of course achieved by the solid electrolyte capacitor of the eighth embodiment shown in FIG. 8.

A comparable result is attained also by the solid electrolyte capacitor shown in FIG. 5 when an adsorber is placed into its case 30.

Ninth and Tenth Embodiments

The solid electrolyte capacitor of the ninth embodiment corresponds to the first embodiment shown in FIG. 1 wherein the seal plate 4 is prepared from copper, a nonmagnetic metal (paramagnetic material). The ninth embodiment has the same hermetic seal structure as the first except this feature.

The solid electrolyte capacitor of the tenth embodiment corresponds to the second embodiment shown in FIG. 3 wherein the pipe pieces 6, 6 are prepared from copper, a nonmagnetic metal (paramagnetic material). With the exception of this feature, the tenth embodiment has the same hermetic seal structure as the second.

Usable as the solid electrolyte of the capacitor element 1 is a TCNQ complex salt or conductive polymer.

In the case where the seal plate 4 or pipe piece 6 is made of a ferromagnetic metal or a metal having high magnetic susceptibility, the lead pin 2 extending through the seal plate 4 or the lead wire 15 extending through the pipe piece 6 causes the seal plate 4 or the pipe piece 6 to act as a coil. This results in the drawback that the addition of reactance due to the coil component in a high-frequency band of not lower than tens of kilohertz entails greater ESR or impedance than is the case with the capacitor element singly present as such.

In contrast, the above drawback is avoidable by using a nonmagnetic metal for the seal plate 4 or pipe pieces 6, 6 as in the ninth or tenth embodiment.

Table 5 shows the initial electric characteristics of the solid electrolyte capacitor of the tenth embodiment of the invention (Invention Example E), the solid electrolyte capacitor of the second embodiment (Comparative Example B) and the conventional solid electrolyte capacitor shown in FIG. 13 (Conventional Example).

TABLE 5

|  | C (μF) | tan δ (%) | ESR (m Ω) | Z (m Ω) |
| --- | --- | --- | --- | --- |
| INVENTION EX. E | 459 | 4.2 | 14 | 14 |
| COMP. EX. B | 463 | 4.4 | 34 | 34 |
| CONVENTIONAL EX. | 460 | 3.5 | 12 | 13 |

In any of Invention Example E, Comparative Example B and Conventional Example, the capacitor element used had ratings of 4 V and 470 μF, and the solid electrolyte used was a TCNQ complex salt. All the capacitors as completed externally measured 8 mm in outside diameter and 7 mm in length L.

In Table 5, represented by C is the capacitance at 120 Hz, by tan δ the tangent of loss angle at 120 Hz, by ESR the equivalent series resistance at 100 kHz, and by Z the impedance at 100 kHz. Each of the characteristics values is the average for ten specimens.

Table 5 reveals that Invention Example E is lower than Comparative Example B in ESR and impedance and is comparable conventional Example in these characteristics, thus indicating that the invention provides solid electrolyte capacitors of low ESR and high reliability.

The nonmagnetic metal for forming the seal plate 4 or pipe pieces 6, 6 is not limited to copper; other known metal such as brass is also usable insofar as the nonmagnetic metal has a melting point higher than the firing temperature (about 500° C.) of glass. It is also useful in the tenth embodiment to prepare both the seal plate 4 and pipe pieces 6, 6 from a nonmagnetic metal.

Eleventh and Twelfth Embodiments

Figure 9:
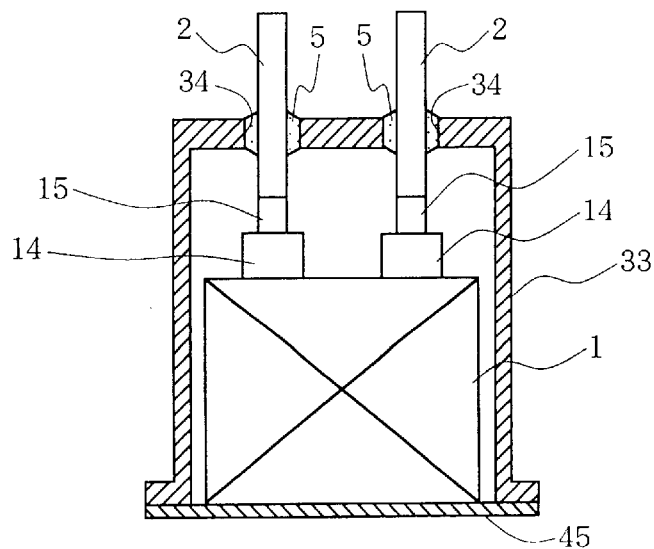
FIG. 9 is a sectional view of another solid electrolyte capacitor as an eleventh embodiment.
Figure 10:
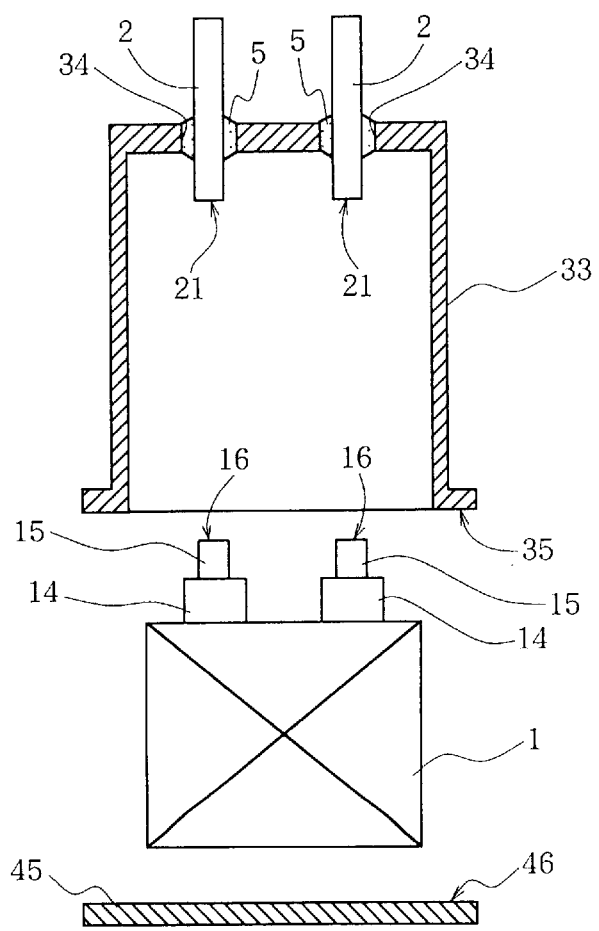
FIG. 10 is a sectional view of a process for assembling the capacitor.

With reference to FIGS. 9 and 10, the solid electrolyte capacitor of the eleventh embodiment comprises a capacitor element 1 housed in a hollow cylindrical nickel-iron alloy case 33 having a closed upper end and an open lower end. The case 33 is closed with a third hermetic seal structure embodying the invention.

Stated more specifically, the case 33 has a pair of through holes 34, 34 formed in its closed end, and has its opening closed with a disklike steel seal plate 45 plated with nickel. On the other hand, a pair of lead wires 15, 15 extending from the capacitor element 1 have respective outer end faces 16, 16, which are joined to the respective lower end faces 21, 21 of a pair of lead pins 2, 2 by resistance welding. The lead pins 2, 2 are inserted through the holes 43, 43 of the case 33 without contacting the inner peripheries of the case closed end defining the holes. An insulating seal 5 of glass is filled in a clearance in each of the holes 43, 43 of the case 33 around the lead pin 2 to effect electrical insulation and to seal off the clearance. The opening-defining edge portion 35 of the case 33 is joined to the outer peripheral edge portion 46 of the seal plate 45 by resistance welding.

Usable as the solid electrolyte of the capacitor element 1 is a TCNQ complex salt or electrically conductive polymer.

In assembling the solid electrolyte capacitor, lead pins 2, 2 are inserted through holes 34, 34 of a case 33, and a molten glass is poured into clearances in the holes 34, 34 around the lead pins 2, 2 to form insulating seals 5, 5 as shown in FIG. 10. Subsequently, the lead wires 15, 15 of the capacitor element 1 are cut to a short length, and the lower end faces 21, 21 of the lead pins 2, 2 are welded to the respective outer cut end faces 16, 16 by resistance welding. The opening-defining edge portion 35 of the case 33 with the capacitor element 1 housed therein is joined to the outer peripheral edge portion 46 of the seal plate 45 by resistance welding.

Figure 11:
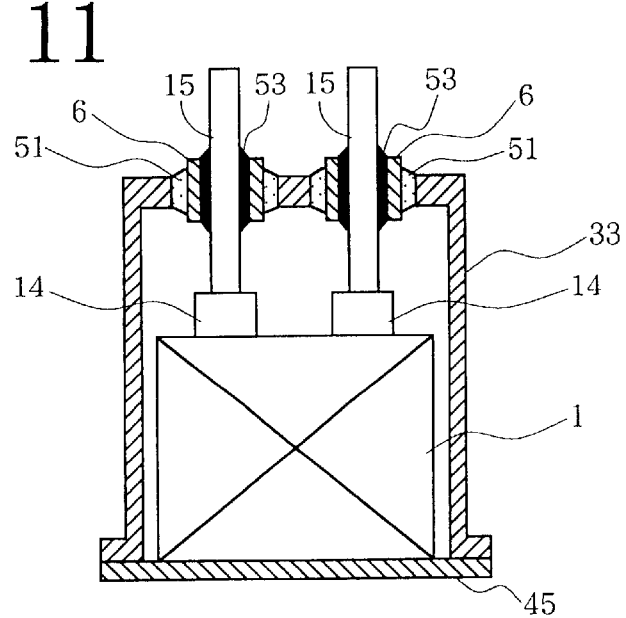
FIG. 11 is a sectional view of another solid electrolyte capacitor as a twelfth embodiment.
Figure 12:
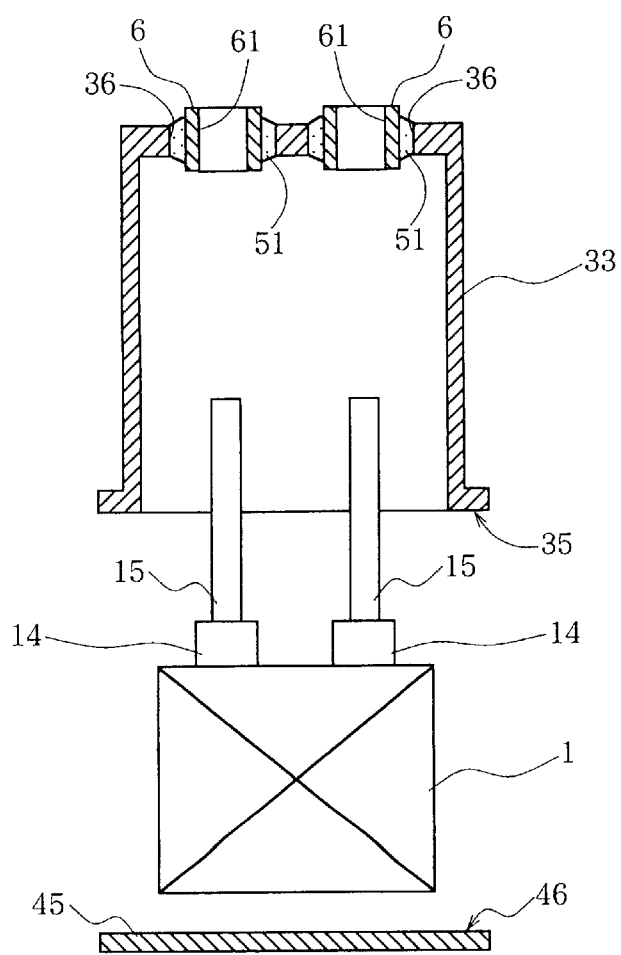
FIG. 12 is a sectional view of a process for assembling the capacitor.

With reference to FIGS. 11 and 12, the solid electrolyte capacitor of the twelfth embodiment comprises a capacitor element 1 housed in a hollow cylindrical nickel-iron alloy case 33 having a closed upper end and an open lower end. The case 33 is closed with a fourth hermetic seal structure embodying the invention.

Stated more specifically, the case 33 has a pair of through holes 36, 36 formed in its closed end, and has its opening closed with a disklike steel seal plate 45 plated with nickel. A pair of copper pipe pieces 6, 6 each having a center bore 61 are inserted through the holes 36, 36 of the case 33 without contacting the inner peripheries of the case closed end defining the holes. An insulating seal 51 of glass is filled in a clearance in each of the holes 36, 36 of the case 33 around the pipe piece 6 to effect electrical insulation and to seal off the clearance.

On the other hand, a pair of lead wires 15, 15 extending from the capacitor element 1 extend through the respective center bores 61, 61 of the pipe pieces 6, 6 without contacting the inner peripheries of the pipe pieces defining the bores. Solder or like brazing material 53 is filled in a clearance in each pipe piece 6 around the lead wire 15 to seal off the clearance. The opening-defining edge portion 35 of the case 33 is joined to the outer peripheral edge portion 46 of the seal plate 45 by resistance welding.

Usable as the solid electrolyte of the capacitor element 1 is a TCNQ complex salt or electrically conductive polymer.

In assembling the solid electrolyte capacitor, pipe pieces 6, 6 are first inserted through holes 36, 36 of a case 33, and a molten glass is poured into clearances in the holes 36, 36 around the pipe pieces 6, 6 to form insulating seals 51, 51 as shown in FIG.12. Subsequently, the lead wires 15, 15 extending from a capacitor element 1 are inserted through the respective center bores 61, 61 of the pipe pieces 6, 6, the capacitor element 1 is housed in the case 33, the opening of the case 33 is thereafter covered with a seal plate 45, and the outer peripheral edge portion 46 of the seal plate 45 is joined to the opening-defining edge portion 35 of the case 33. Finally, molten solder serving as a brazing material 53 is poured into clearances in the center bores 61, 61 of the pipe pieces 6, 6 around the lead wires 15, 15 to seal off the clearances.

In the solid electrolyte capacitors of the eleventh and twelfth embodiments, the heat produced when the seal plate 45 is welded to the case 33 exerts little or no influence on the insulating seals 5 or 51 and the vicinity thereof. Accordingly, the glass forming the insulating seals 5 or 51 is unlikely to develop a crack, or no crack will develop in the glass surface in contact with the case 33 or pipe piece 6.

The solid electrolyte capacitor of the twelfth embodiment shown in FIG. 11 (Invention Example F) and the solid electrolyte capacitor of the second embodiment shown in FIG. 3 (Comparative Example C) were subjected to a bubble leak test by immersing the capacitors in an inert liquid heated to about 130° C. for about 40 seconds and checked for occurrence of bubbles. Table 6 shows the result. The number of specimens used for either of the examples was 1000.

TABLE 6

|  | RATIO OF FAULTY SEALS |
| --- | --- |
| INVENTION EX. F | 0/1000p. |
| COMP. EX. C | 2/1000p. |

In either of Invention Example F and Comparative Example C, the capacitor element used had ratings of 4 V and 470 $\mu$F, and the solid electrolyte used was a TCNQ complex salt. All the capacitors as completed externally measured 8 mm in outside diameter and 7 mm in length L.

The table reveals that Invention Example F released no bubbles under the severe conditions described, indicating that the twelfth embodiment affords a further improved hermetic structure.

The capacitors of Invention Example F and Comparative Example C were further subjected to a high-temperature load test by applying the rated voltage to the capacitor continuously for 1000 hours in an environment of 125° C. and ordinary humidity, and to a high-temperature high-humidity test by allowing the capacitor to stand in an environment of 60° C. and RH 90% for 1000 hours without application of voltage. The capacitors were checked for electric characteristics before and after testing. Tables 7 and 8 show the results.

TABLE 7

High-Temperature Load Test

|  | Δ C/C (%) AFTER 1000 H | tan δ (%) INITIAL | tan δ (%) AFTER 1000 H | ESR (mΩ) INITIAL | ESR (mΩ) AFTER 1000 H | LC FAULT RATIO AFTER 1000 H |
|---|---|---|---|---|---|---|
| INVENTION EX. F | −0.98 | 4.3 | 4.4 | 13 | 13 | 0/10 p. |
| COMP. EX. C | −1.85 | 4.2 | 4.4 | 14 | 14 | 0/10 p. |

TABLE 8

High-Temperature High-Humidity Test

|  | Δ C/C (%) AFTER 1000 H | tan δ (%) INITIAL | tan δ (%) AFTER 1000 H | ESR (mΩ) INITIAL | ESR (mΩ) AFTER 1000 H | LC FAULT RATIO AFTER 1000 H |
|---|---|---|---|---|---|---|
| INVENTION EX. F | −0.30 | 4.2 | 4.3 | 13 | 14 | 0/10 p. |
| COMP. EX. C | −0.85 | 4.3 | 4.3 | 14 | 15 | 0/10 p. |

In these tables, represented by Δ C/C is the ratio of the variation of capacitance resulting from the test to the capacitance before the test, by tan δ the tangent of loss angle at 120 Hz, and by ESR the equivalent series resistance at 100 kHz, and "LC fault ratio" means the number of specimens in which the leakage current was in excess of a predetermined threshold value (190 μA) when measured 60 seconds after the start of application of the rated voltage. Each of the characteristics values is the average for ten specimens.

The tables reveal that Invention Example F is smaller than Comparative Example C in the variation of capacitance. Thus, solid electrolyte capacitors can be given further improved reliability by the twelfth embodiment.

The capacitors of the present invention are not limited to the foregoing embodiments in construction but can be modified variously without departing from the spirit of the invention as set forth in the appended claims. For examples, a component member of particular structure of one embodiment, or a material used therein, or a production step thereof may be replaced by the corresponding one of another embodiment or by an equivalent. Alternatively, component members, materials or steps may be used in a different combination.

Usable as solid electrolytes in place of TCNQ complex salts are electrically conductive high-molecular-weight compounds such as polypyrrole, polythiophene, polyaniline, derivatives of these compounds, manganese dioxide, lead dioxide, etc.

Examples of starting materials usable in place of 3,4-ethylenedioxythiophene for forming the conductive polymer layer are monomers which are convertible into conductive polymers by oxidative polymerization, such as pyrrole, thiophene, furan, aniline and derivatives of these compounds.

The anode foil for the capacitor element is not limited to aluminum, but also usable is a chemical conversion foil obtained by anodically oxidizing a metal acting a valve, such as tantalum or niobium.

What is claimed is:

1. A solid electrolyte capacitor comprising a tubular metal case having an opening at one end and closed at the other end, and a capacitor element housed in the case, the capacitor element comprising an anode foil, a cathode foil and a separator interposed therebetween which are wound up into a roll and prepared by impregnating the roll with a solid electrolyte or by forming an electrically conductive polymer layer in the roll, the anode foil and the cathode foil having a pair of lead wires extending therefrom respectively, the case being closed with a hermetic seal structure, wherein the hermetic seal structure comprises:

a metal seal plate formed with a pair of through holes and installed to close the opening of the case, the seal plate having an outer peripheral edge portion joined to an opening-defining edge portion of the case;

a pair of lead pins inserted through the respective holes of the seal plate without contacting inner peripheries of the seal plate defining the respective holes; and insulating seals filled in respective clearances in the holes of the seal plate around the lead pins;

the lead wires having respective outer ends thereof joined within the case to respective base ends of the lead pins.

2. A solid electrolyte capacitor according to claim 1 wherein the seal plate is made of a nonmagnetic metal.

3. A solid electrolyte capacitor according to claim 1 wherein the case has an inert gas atmosphere or a vacuum inside thereof.

4. A solid electrolyte capacitor according to claim 1 wherein the opening-defining edge portion of the case and the inner peripheral edge portion of the seal plate are welded to each other.

5. A solid electrolyte capacitor according to claim 1 wherein an adsorber is placed in the case.

6. A solid electrolyte capacitor comprising a tubular metal case having an opening at one end and closed at the other end, and a capacitor element housed in the case, the capacitor element comprising an anode foil, a cathode foil and a separator interposed therebetween which are wound up into a roll and prepared by impregnating the roll with a solid electrolyte or by forming an electrically conductive polymer layer in the roll, the anode foil and the cathode foil having a pair of lead wires extending therefrom respectively, the case being closed with a hermetic seal structure, wherein the hermetic seal structure comprises:

a metal seal plate installed to close the opening of the case and having an outer peripheral edge portion joined to an opening-defining edge portion of the case;

a pair of lead pins inserted through respective through holes formed in the closed end of the case without contacting inner peripheries of the case closed end defining the respective holes; and insulating seals filled in respective clearances in the holes of the case around the lead pins;

the lead wires having respective outer ends thereof joined within the case to respective base ends of the lead pins.

7. A solid electrolyte capacitor according to claim 6 wherein the case has an inert gas atmosphere or a vacuum inside thereof.

8. A solid electrolyte capacitor according to claim 6 wherein the opening-defining edge portion of the case and the inner peripheral edge portion of the seal plate are welded to each other.

9. A solid electrolyte capacitor according to claim 6 wherein an adsorber is placed in the case.

10. A solid electrolyte capacitor comprising a tubular metal case having an opening at one end and closed at the other end, and a capacitor element housed in the case, the capacitor element comprising an anode foil, a cathode foil and a separator interposed therebetween which are wound up into a roll and prepared by impregnating the roll with a solid electrolyte or by forming an electrically conductive polymer layer in the roll, the anode foil and the cathode foil having a pair of lead wires extending therefrom respectively, the case being closed with a hermetic seal structure, wherein the hermetic seal structure comprises:

a metal seal plate formed with a pair of through holes and installed to close the opening of the case, the seal plate having an outer peripheral edge portion joined to an opening-defining edge portion of the case;

a pair of pipe pieces each having a center bore and inserted through the respective holes of the seal plate without contacting inner peripheries of the seal plate defining the respective holes, the lead wires extending through the respective center bores without contacting bore-defining inner peripheries of the pipe pieces;

insulating seals filled in respective clearances in the holes of the seal plate around the pipe pieces; and a brazing material filled in respective clearances in the pipe pieces around the lead wires.

11. A solid electrolyte capacitor according to claim 10 wherein the pipe pieces are made of a nonmagnetic metal.

12. A solid electrolyte capacitor according to claim 10 wherein the case has an inert gas atmosphere or a vacuum inside thereof.

13. A solid electrolyte capacitor according to claim 10 wherein the opening-defining edge portion of the case and the inner peripheral edge portion of the seal plate are welded to each other.

14. A solid electrolyte capacitor according to claim 10 wherein an adsorber is placed in the case.

15. A solid electrolyte capacitor comprising a tubular metal case having an opening at one end and closed at the other end, and a capacitor element housed in the case, the capacitor element comprising an anode foil, a cathode foil and a separator interposed therebetween which are wound up into a roll and prepared by impregnating the roll with a solid electrolyte or by forming an electrically conductive polymer layer in the roll, the anode foil and the cathode foil having a pair of lead wires extending therefrom respectively, the case being closed with a hermetic seal structure, wherein the hermetic seal structure comprises:

a metal seal plate installed to close the opening of the case and having an outer peripheral edge portion joined to an opening-defining edge portion of the case;

a pair of pipe pieces each having a center bore and inserted through respective through holes formed in the closed end of the case without contacting inner peripheries of the case closed end defining the respective holes, the lead wires extending through the respective center bores without contacting bore-defining inner peripheries of the pipe pieces;

insulating seals filled in respective clearances in the holes of the case around the pipe pieces; and a brazing material filled in respective clearances in the pipe pieces around the lead wires.

16. A solid electrolyte capacitor according to claim 15 wherein the pipe pieces are made of a nonmagnetic metal.

17. A solid electrolyte capacitor according to claim 15 wherein the case has an inert gas atmosphere or a vacuum inside thereof.

18. A solid electrolyte capacitor according to claim 15 wherein the opening-defining edge portion of the case and the inner peripheral edge portion of the seal plate are welded to each other.

19. A solid electrolyte capacitor according to claim 15 wherein an adsorber is placed in the case.

20. A solid electrolyte capacitor comprising a tubular metal case having an opening at one end and closed at the other end, and a capacitor element housed in the case, the capacitor element comprising an anode foil, a cathode foil and a separator interposed therebetween which are wound up into a roll and being prepared by impregnating the roll with a solid electrolyte or by forming an electrically conductive polymer layer in the roll, the anode foil and the cathode foil having a pair of lead wires extending therefrom respectively, the capacitor being characterized in that a rubber seal member is hermetically fitted in the opening of the case, the lead wires extending through the seal member hermetically, the case having an inert gas atmosphere or a vacuum enclosed therein.

21. A solid electrolyte capacitor according to claim 20 wherein the case has a constricted opening portion having the seal member fitted therein for compressing the seal member over the entire circumference thereof to seal off the opening hermetically.

22. A solid electrolyte capacitor according to claim 20 wherein an adsorber is placed in the case.

* * * * *